United States Patent
Hsiao et al.

(10) Patent No.: US 11,294,513 B1
(45) Date of Patent: Apr. 5, 2022

(54) TRANSPARENT CONDUCTIVE FILM, MANUFACTURING METHOD OF A TRANSPARENT CONDUCTIVE FILM AND TOUCH PANEL

(71) Applicant: Cambrios Film Solutions Corporation, Tortola (VG)

(72) Inventors: Chung-Chin Hsiao, Hsinchu County (TW); Siou-Cheng Lien, Miaoli County (TW); Yi-Wen Chiu, Taoyuan (TW); Chia-Yang Tsai, New Taipei (TW)

(73) Assignee: Cambrios Film Solutions Corporation, Tortola (VG)

( * ) Notice: Subject to any disclaimer, the term of this patent is extended or adjusted under 35 U.S.C. 154(b) by 0 days.

(21) Appl. No.: 16/953,820

(22) Filed: Nov. 20, 2020

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04103* (2013.01); *G06F 2203/04112* (2013.01)

(58) Field of Classification Search
CPC .................. G06F 3/044; G06F 3/0412; G06F 2203/04103; G06F 2203/04112
See application file for complete search history.

(56) References Cited

U.S. PATENT DOCUMENTS

| | | | | |
|---|---|---|---|---|
| 2010/0156840 | A1* | 6/2010 | Frey | G06F 3/044 345/174 |
| 2011/0273085 | A1* | 11/2011 | Garbar | B32B 15/02 313/509 |
| 2015/0079372 | A1* | 3/2015 | Tsai | G06F 3/0445 428/216 |
| 2021/0141491 | A1* | 5/2021 | Gogte | G06F 3/0448 |

FOREIGN PATENT DOCUMENTS

| | | |
|---|---|---|
| TW | 201445586 A | 12/2014 |
| TW | 201738710 A | 11/2017 |
| TW | 201843220 A | 12/2018 |
| WO | 2013008827 A1 | 1/2013 |

* cited by examiner

*Primary Examiner* — Peter D McLoone
(74) *Attorney, Agent, or Firm* — Cooper Legal Group, LLC (57) ABSTRACT

A transparent conductive film and method for making transparent conductive film and touch panel are disclosed. The transparent conductive film includes a substrate and a conductive mesh film. The substrate has a first surface. The conductive mesh film is formed on the first surface of substrate, and the conductive mesh film includes a plurality of silver nanowires. The conductive mesh film includes a plurality of meshes, and the meshes comprise a plurality of traces and a plurality of blank areas. The sheet resistance of the conductive mesh film is 5 Ω/sq to 30 Ω/sq, the width of each of the traces is 1 μm to 10 μm, and a transparency of the conductive mesh film to visible light is greater than 85%.

15 Claims, 8 Drawing Sheets

TRANSPARENT CONDUCTIVE FILM, MANUFACTURING METHOD OF A TRANSPARENT CONDUCTIVE FILM AND TOUCH PANEL

BACKGROUND OF THE DISCLOSURE

1. Field of the Disclosure

The present disclosure relates to a transparent conductive film. More particularly, the present disclosure relates to a transparent conductive film and a manufacturing method of the transparent conductive film for manufacturing a touch panel.

2. Description of Related Art

Recently, the application of touch panels is becoming more extensive. More and more electronic products are equipped with touch panels to provide the functions of direct operation or issuing commands for making those electronic products user-friendly. In the current manufacturing process of touch panels, the metal mesh is made of thin-film metal to achieve good penetration. However, the metal mesh made of thin-film metal has poor flexibility and is easily broken due to bending. Moreover, in general, the metal mesh made of thin-film metal requires additional metal wires to connect with the lines in the peripheral area, and the combination of the metal mesh and the additional metal wires will generate higher resistance, causing signal loss and distortion. Therefore, the structure and the preparation process need to be further improved.

SUMMARY OF THE DISCLOSURE

Accordingly, the main object of the present disclosure is to provide a novel transparent conductive laminated structure and a novel touch panel having a simplified manufacturing process and a lower preparation cost and being environmentally friendly.

The present disclosure provides a novel transparent conductive film, which comprises a substrate and a conductive mesh film. The conductive mesh film is disposed on a first surface of the substrate, and the conductive mesh film comprises a plurality of silver nanowires, wherein the conductive mesh film includes a plurality of meshes, and the meshes comprise a plurality of traces and a plurality of blank areas. A sheet resistance of the conductive mesh film is 5 Ω/sq to 30 Ω/sq, a width of each of the traces is 1 μm to 10 μm, and a transparency of the conductive mesh film to visible light is greater than 85%.

In one embodiment, the substrate comprises a display area and a periphery area, the conductive mesh film disposed in the display area has the meshes, the conductive mesh film disposed in the periphery area has a plurality of conductive wires, and the conductive wires are respectively electrically connected to the traces of the meshes.

In one embodiment, the conductive wires comprise the silver nanowires, and a sheet resistance of each of the traces and a sheet resistance of each of the conductive wires are 0.1 Ω/sq to 1 Ω/sq.

In one embodiment, each of the blank areas occupies an area of 100 to 200 μm$^2$ on the first surface.

In one embodiment, the transparent conductive film further comprises a coating layer disposed on the conductive mesh film and configured to cover the conductive mesh film, wherein a thickness of the coating layer is 40 nm.

In one embodiment, a ratio of a total area of the blank areas to an area of the conductive mesh film is 0.9 to 0.999.

The present disclosure also provides a manufacturing method of a transparent conductive film, which comprises: coating a silver nanowires layer on a first surface of a substrate, wherein the silver nanowires layer is formed by a plurality of silver nanowires; patterning the silver nanowires layer to form a conductive mesh film, wherein the conductive mesh film comprises a plurality of meshes, and the meshes comprise a plurality of traces and a plurality of blank areas; and forming a transparent conductive film, wherein a sheet resistance of the conductive mesh film is 5 Ω/sq to 30 Ω/sq, a width of each of the traces is 1 μm to 10 μm, and a transparency of the conductive mesh film to visible light is greater than 85%.

In one embodiment, the substrate comprises a display area and a periphery area, the conductive mesh film disposed in the display area has the meshes, the conductive mesh film disposed in the periphery area has a plurality of conductive wires, and the conductive wires are respectively electrically connected to the traces of the meshes.

In one embodiment, the conductive wires comprise the silver nanowires, and a sheet resistance of each of the traces and a sheet resistance of each of the conductive wires are 0.1 Ω/sq to 1 Ω/sq.

In one embodiment, each of the blank areas occupies an area of 100 to 200 μm$^2$ on the first surface.

In one embodiment, the method further comprises coating a coating layer on the silver nanowires layer, wherein a thickness of the coating layer is 40 nm.

In one embodiment, a ratio of a total area of the blank areas to an area of the silver nanowires layer is 0.9 to 0.999.

The present disclosure also provides a touch panel comprising a first substrate, a first conductive mesh film, and a second conductive mesh film. The first substrate has a first surface and a second surface opposite to the first surface. The first conductive mesh film is disposed on the first surface of the first substrate. The second conductive mesh film is disposed on the first conductive mesh film, wherein the first conductive mesh film and the second conductive mesh film comprise a plurality of silver nanowires, wherein the first conductive mesh film and the second conductive mesh film comprise a plurality of meshes, the meshes comprise a plurality of traces and a plurality of blank areas, a sheet resistance of the first conductive mesh film and a sheet resistance of the second conductive mesh film are 5 Ω/sq to 30 Ω/sq, a width of each of the traces is 1 μm to 10 μm, and a transparency of the first conductive mesh film and a transparency of the second conductive mesh film to visible light are greater than 85%.

In one embodiment, the touch panel further comprises an adhesive layer disposed between the first conductive mesh film and the second conductive mesh film.

In one embodiment, the touch panel further comprises a second substrate and an adhesive layer, the second substrate has an third surface and a fourth surface opposite to the third surface, wherein the second conductive mesh film is disposed on the third surface of the second substrate, the adhesive layer is disposed between the first conductive mesh film and the fourth surface.

The present disclosure also provides a touch panel, including a display area and a periphery area. The touch panel comprises a first substrate, a first conductive mesh film, and a second conductive mesh film. The first conductive mesh film is disposed on a first surface of the first substrate. The second conductive mesh film disposed on a second surface of the first substrate, wherein the first conductive mesh film and the second conductive mesh film comprise a plurality of silver nanowires, wherein the first conductive mesh film and the second conductive mesh film comprise a plurality of meshes, the meshes comprise a plurality of traces and a plurality of blank areas, a sheet resistance of the first conductive mesh film and a sheet resistance of the second conductive mesh film are 5 Ω/sq to 30 Ω/sq, a width of each of the traces is 1 µm to 10 µm, and a transparency of the first conductive mesh film and a transparency of the second conductive mesh film to visible light are greater than 85%.

The transparent conductive film, manufacturing method of a transparent conductive film and touch panel are capable of utilizing the silver nanowires mesh film formed by the silver nanowires. The silver nanowires mesh film has ultra-low sheet resistance and can maintain good transmittance, and the silver nanowires mesh film also has better bending characteristics. Moreover, the silver nanowires mesh can be utilized to replace metal wires in the periphery area to solve the problem of contact impedance generated when connecting metal wires and silver nanowires mesh. Therefore, the silver nanowires mesh film can reduce signal loss and distortion.

DETAILED DESCRIPTION

The following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

It will be understood that, in the description herein and throughout the claims that follow, when an element is referred to as being "connected" or "coupled" to another element, the element can be directly connected or coupled to the other element or intervening elements may be present.

It should be noted that the term "on" in the specification may be used herein to describe the relative positions between components. For example, a first component being disposed on a second component includes embodiments in which the two components are formed in direct contact, and may also include embodiments in which additional components may be formed between the two components.

It will be understood that, in the description herein and throughout the claims that follow, although the terms "first," "second," and "third" and etc. may be used to describe various elements, these elements should not be limited by these terms. These terms are only used to distinguish one element from another. For example, a first element could be termed a second element, and, similarly, a second element could be termed a first element, without departing from the scope of the embodiments.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
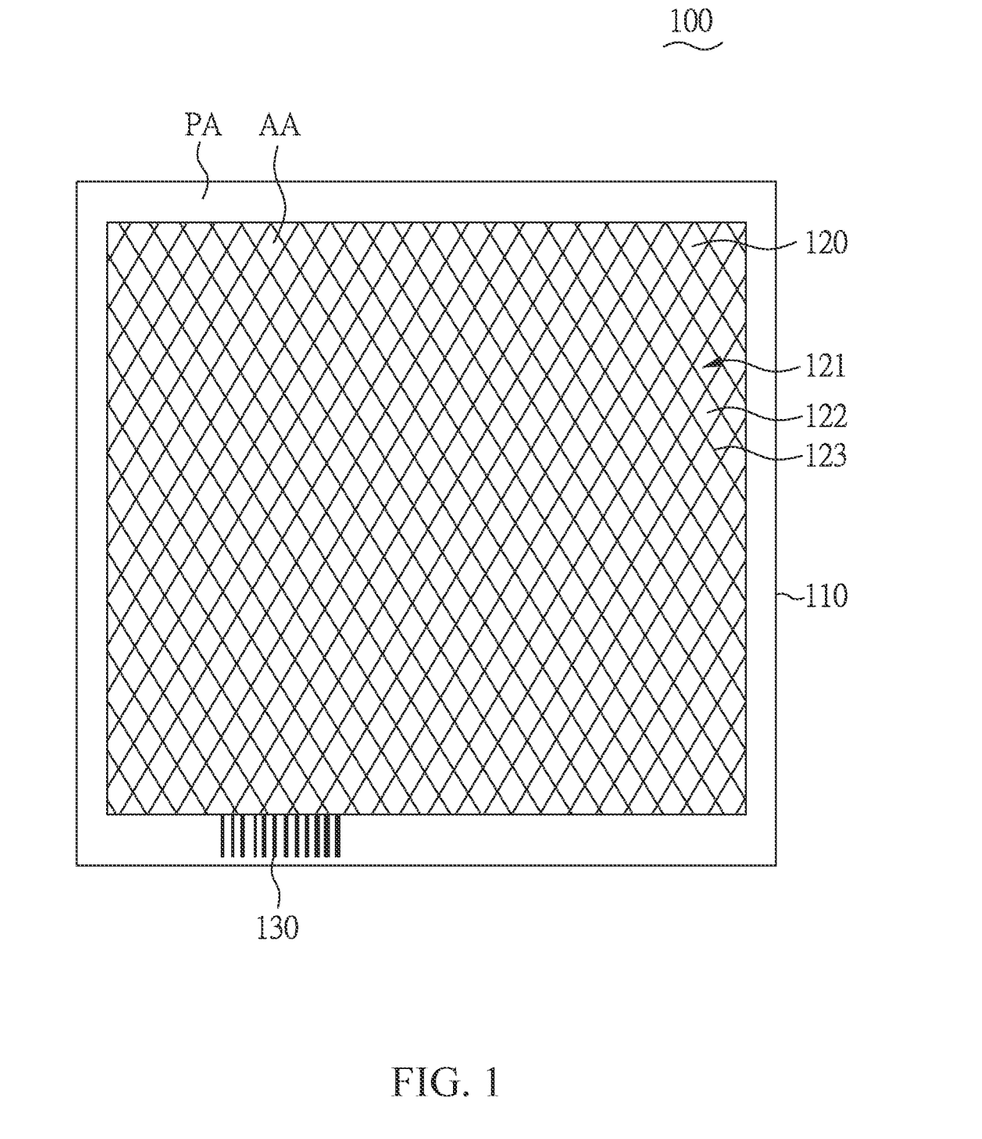
FIG. 1 is a top view of a transparent conductive film according to an embodiment of the present disclosure.
Figure 2:
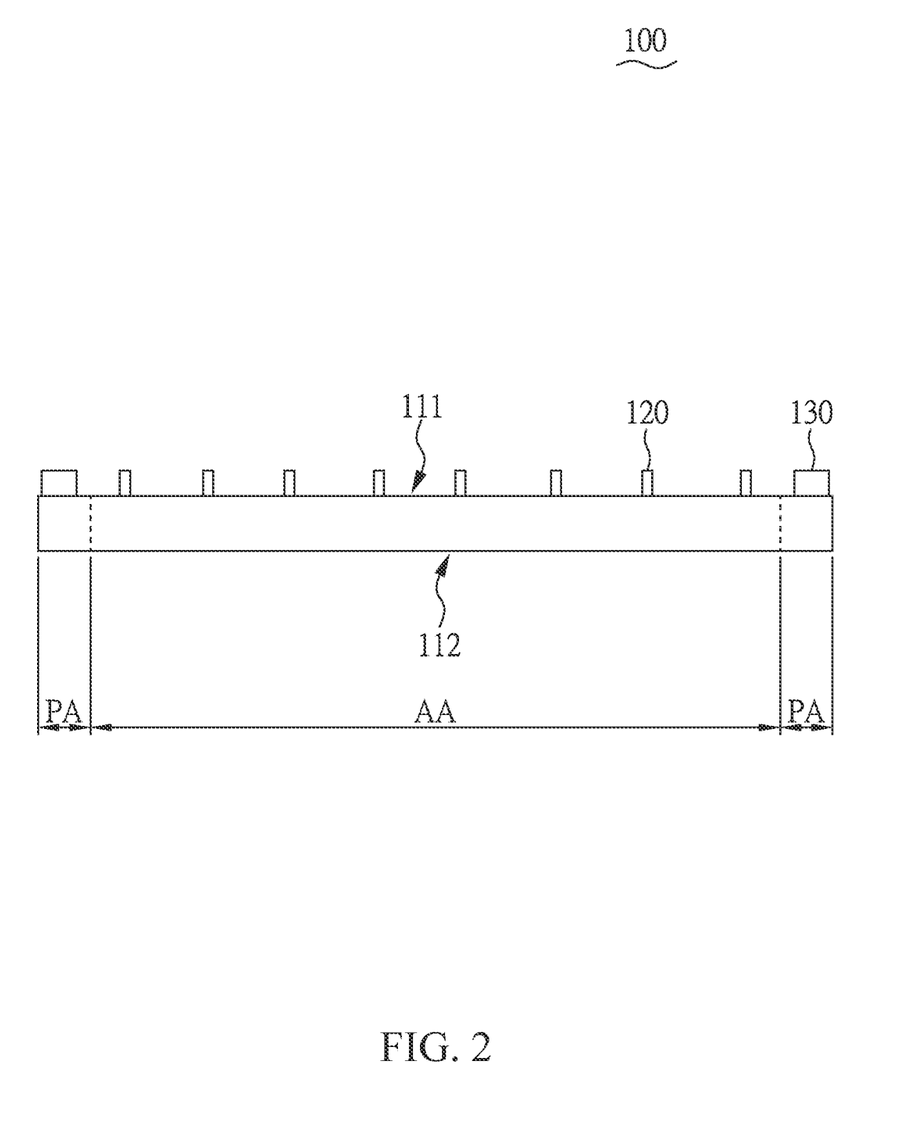
FIG. 2 is a sectional view of the transparent conductive film according to an embodiment of the present disclosure.

Reference is made to FIG. 1 and FIG. 2. FIG. 1 is a top view of a transparent conductive film 100 according to an embodiment of the present disclosure, and FIG. 2 is a sectional view of the transparent conductive film 100 according to the first embodiment of the present disclosure. As shown in FIG. 1, the transparent conductive film 100 includes a substrate 110, a conductive mesh film 120, and a plurality of conductive wires 130. The substrate 110 includes a display area AA and a periphery area PA. The conductive mesh film 120 is disposed on the display area AA, and the conductive wires 130 are disposed on the periphery area PA. In this embodiment, the substrate 110 provides mechanical support or protection for the conductive mesh film 120 and can be made of materials known in the art. Preferably, the substrate 110 is made of flexible materials such as polyvinyl chloride (PVC), polypropylene (PP), polyethylene terephthalate (PET), cycloolefin polymer (COP), polyethylene naphthalate (PEN), triacetate (TAC), polycarbonate (PC), Polystyrene (PS), polyimide (PI), or the like.

Afterwards, as shown in FIG. 1 and FIG. 2, the substrate 110 includes a surface 111 and a surface 112 opposite to the surface 111. The conductive mesh film 120 is disposed on the surface 111 of the substrate 110. In this embodiment, the conductive mesh film 120 is formed by a plurality of silver nanowires (SNW), and the conductive mesh film 120 includes a plurality of meshes 121. The meshes 121 include or are composed of a plurality of blank areas 122 and a plurality of traces 123. It is noted that, the traces 123 are electrically connected to the conductive wires 130 located in the periphery area PA.

Figure 3:
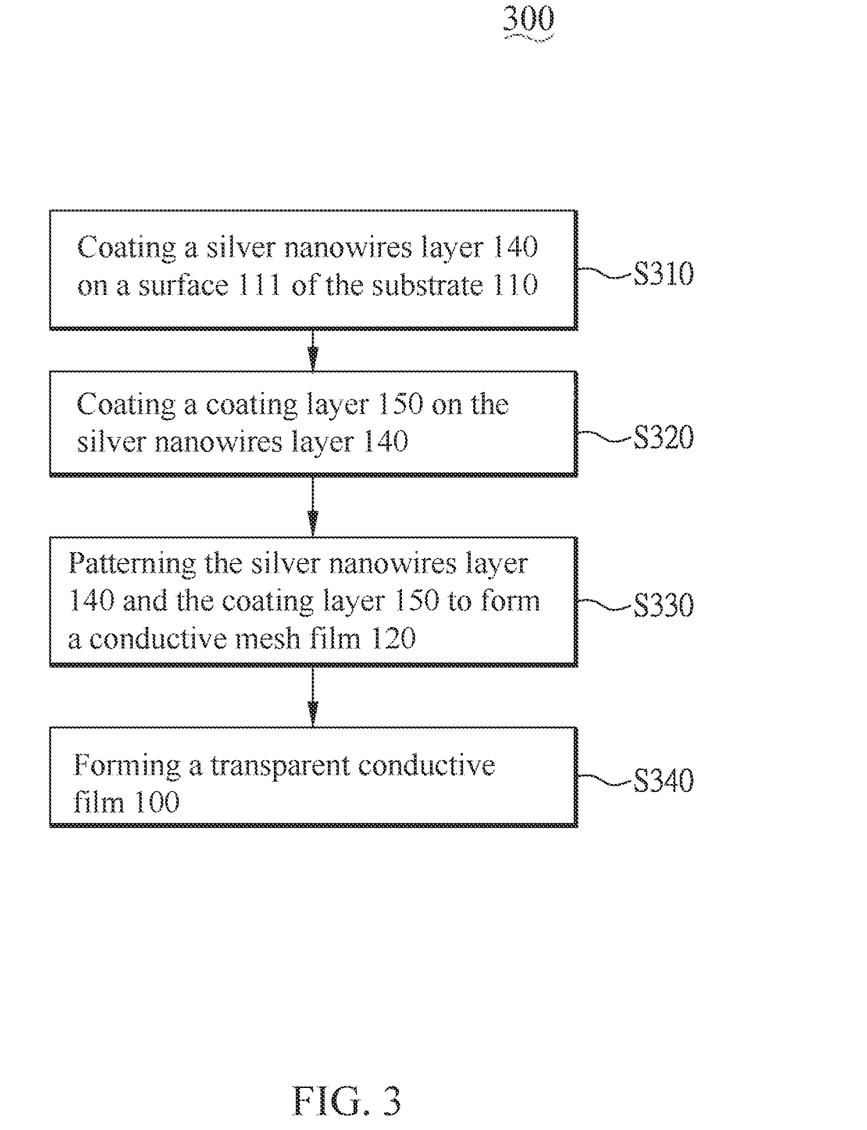
FIG. 3 is a flow diagram illustrating a manufacturing method of the transparent conductive film according to an embodiment of the present disclosure.
Figure 4:
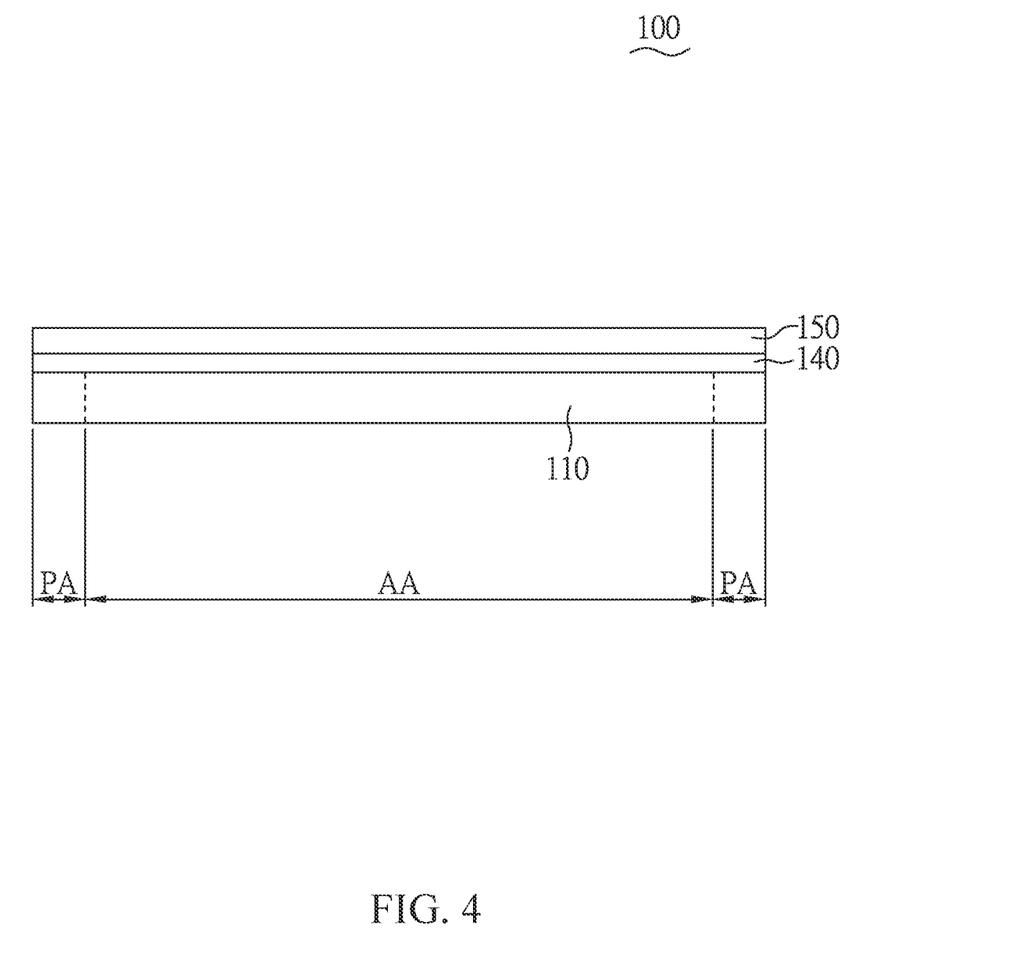
FIG. 4 is a sectional view of the transparent conductive film according to an embodiment of the present disclosure.

Reference is made to FIG. 3 and FIG. 4. FIG. 3 is a flow diagram illustrating a manufacturing method 300 of a transparent conductive film according to an embodiment of the present disclosure, and FIG. 4 is a sectional view of the transparent conductive film 100 according to an embodiment of the present disclosure. In the embodiment, the steps shown in FIG. 3 are executed to manufacture the transparent conductive film 100 shown in FIGS. 1 and 2. The step S310 is firstly executed to coat a silver nanowires layer 140 on a surface 111 of the substrate 110, and then the step S320 is executed to coat a coating layer 150 on the silver nanowires layer 140. The coating layer 150 is formed on the silver nanowires layer 140 and is configured to cover the silver nanowires layer 140, thereby improving the durability of the silver nanowire. It is noted that a thickness of the coating layer 150 is about 40 nm.

Figure 5:
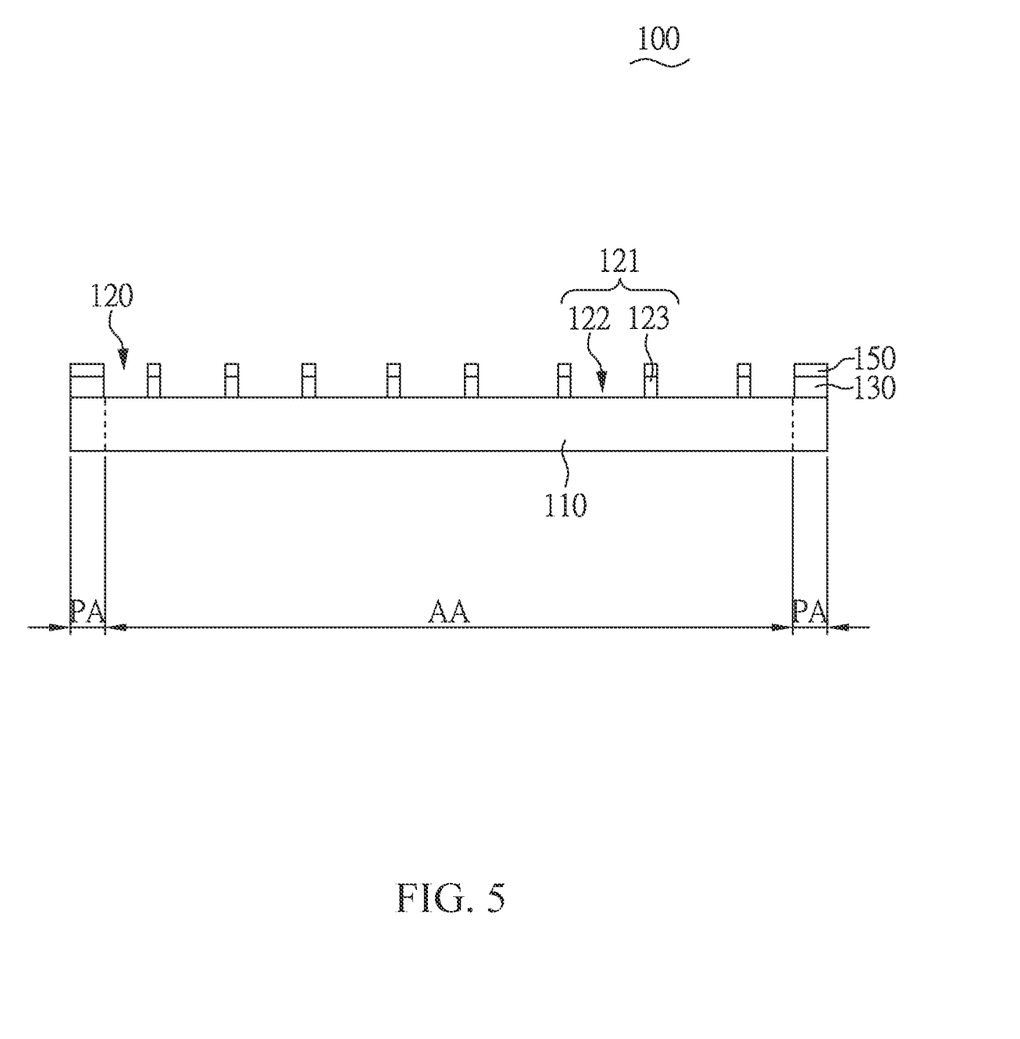
FIG. 5 is a sectional view of the transparent conductive film according to an embodiment of the present disclosure.

Afterwards, the step S330 is executed to pattern the silver nanowires layer 140 and the coating layer 150 to form the conductive mesh film 120, and step S340 is executed to form the transparent conductive film 100. Reference is made to FIG. 5, which is a sectional view of the transparent conductive film 100 according to the embodiment of the present disclosure. In this embodiment, a photoresist exposure and development process is utilized to pattern the silver nanowire layer 140 for forming the conductive mesh film 120 in the display area AA and forming the conductive wires 130 in the periphery area PA and to form the transparent conductive film 100.

Afterwards, it is noted that, the conductive wires 130 include or are composed of the silver nanowires, and the material of the conductive wires 130 is same as the material of the conductive mesh film 120. In this way, the traces 123 in the display area AA and the conductive wires 130 in the periphery area PA can be made synchronously (e.g., concurrently), reducing the signal loss and distortion when the traces 123 of the display area AA are connected to the conductive wires 130 of the peripheral area PA.

Afterwards, in this embodiment, the transparency of the conductive mesh film 120 is greater than 85% (to visible light having a wavelength between 400 nm and 700 nm), and the sheet resistance of the conductive mesh film 120 is 5 Ω/sq (ohms per square) to 30 Ω/sq. The width of each of the traces 123 is 1 μm to 10 μm, preferably 2 μm-3 μm. The sheet resistance of each of the traces 123 and a sheet resistance of each of the conductive wires 130 are 0.1 Ω/sq to 1 Ω/sq, and each of the blank areas 122 is 100 to 200 μm². It is noted that a ratio of a total area of the blank areas 122 to an area of the conductive mesh film 120 is 0.9 to 0.999.

Afterwards, in traditional process technology, bulk metal is utilized with the lithography process technology to form a continuous metal mesh. However, the continuous metal mesh formed by bulk metal has poor flexibility. As shown in Table 1, the experimental example compares three implementations including silver nanowires, silver nanowires bonding coating layer (e.g., silver nanowires layer 140 covered with coating layer 150), and copper wire. The line resistance (ohm) of the continuous metal mesh formed by copper wire cannot be measured after being bent continuously more than 38,000 times. The line resistance (ohm) of the continuous metal mesh formed by silver nanowires cannot be measured after being bent continuously more than 160,000 times. However, the continuous metal mesh formed by silver nanowires bonding coating layer can be bent about 250,000 times, and the line resistance (ohm) can still be measured. The above measurement results are shown in Table 1.

TABLE 1

| Bending cycle | 0 | 38000 | 160000 | 250000 |
|---|---|---|---|---|
| Silver nanowires | 7894 (ohm) | 7930 (ohm) | X | X |
| Silver nanowires bonding coating layer | 8117 (ohm) | 8040 (ohm) | 8139 (ohm) | 8152 (ohm) |
| Copper wire | 1056 (ohm) | X | X | X |

The results of the experimental example show that the touch display provided by the present disclosure has better bending characteristics, can be bent continuously up to 250,000 times, and the line resistance change rate of the silver nanowire after bending is less than 1%.

Figure 6:
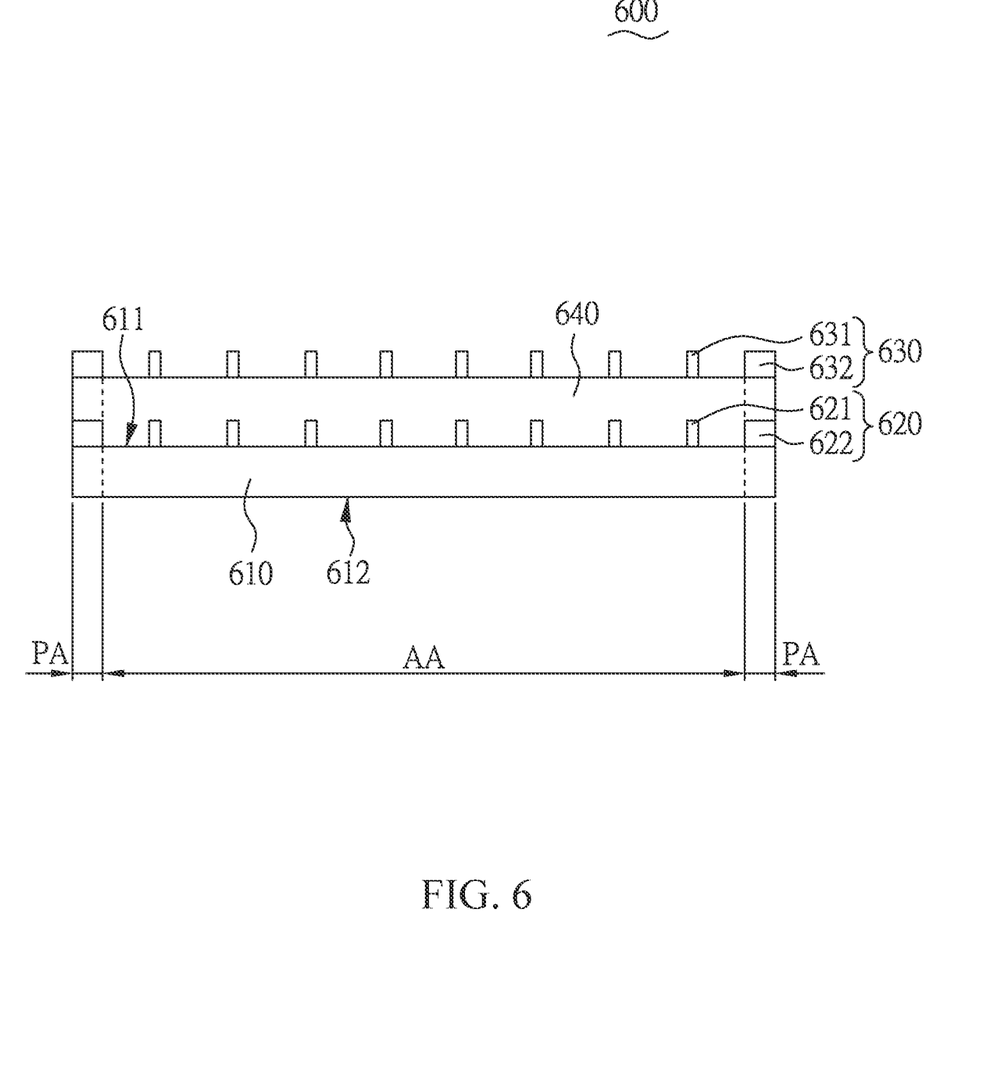
FIG. 6 is a sectional view of a touch panel according to an embodiment of the present disclosure.

In another embodiment, reference is made to FIG. 6, which is a sectional view of the touch panel 600 according to an embodiment of the present disclosure. As shown in FIG. 6, the touch panel 600 includes a substrate 610, conductive mesh films 620 and 630, and an adhesive layer 640. The touch panel 600 has a display area AA and a periphery area PA. The substrate 610 has a surface 611 and a surface 612 opposite to the surface 611. The conductive mesh film 620 is formed on the surface 611 of the substrate 610. The conductive mesh film 630 is formed on the conductive mesh film 620. The adhesive layer 640 is formed between the conductive mesh film 620 and the conductive mesh film 630, and the conductive mesh film 630 is attached to the conductive mesh film 620 by the adhesive layer 640. It is noted that, the traces 621 and 631 are formed on the display area AA, and the conductive wires 622 and 632 are formed on the periphery area PA.

Afterwards, the conductive mesh films 620 and 630 in this embodiment are similar to the embodiment of the conductive mesh film 120. The conductive mesh films 620 and 630 have multiple meshes and multiple conductive wires. For the sake of brevity, those descriptions will not be repeated here.

Figure 7:
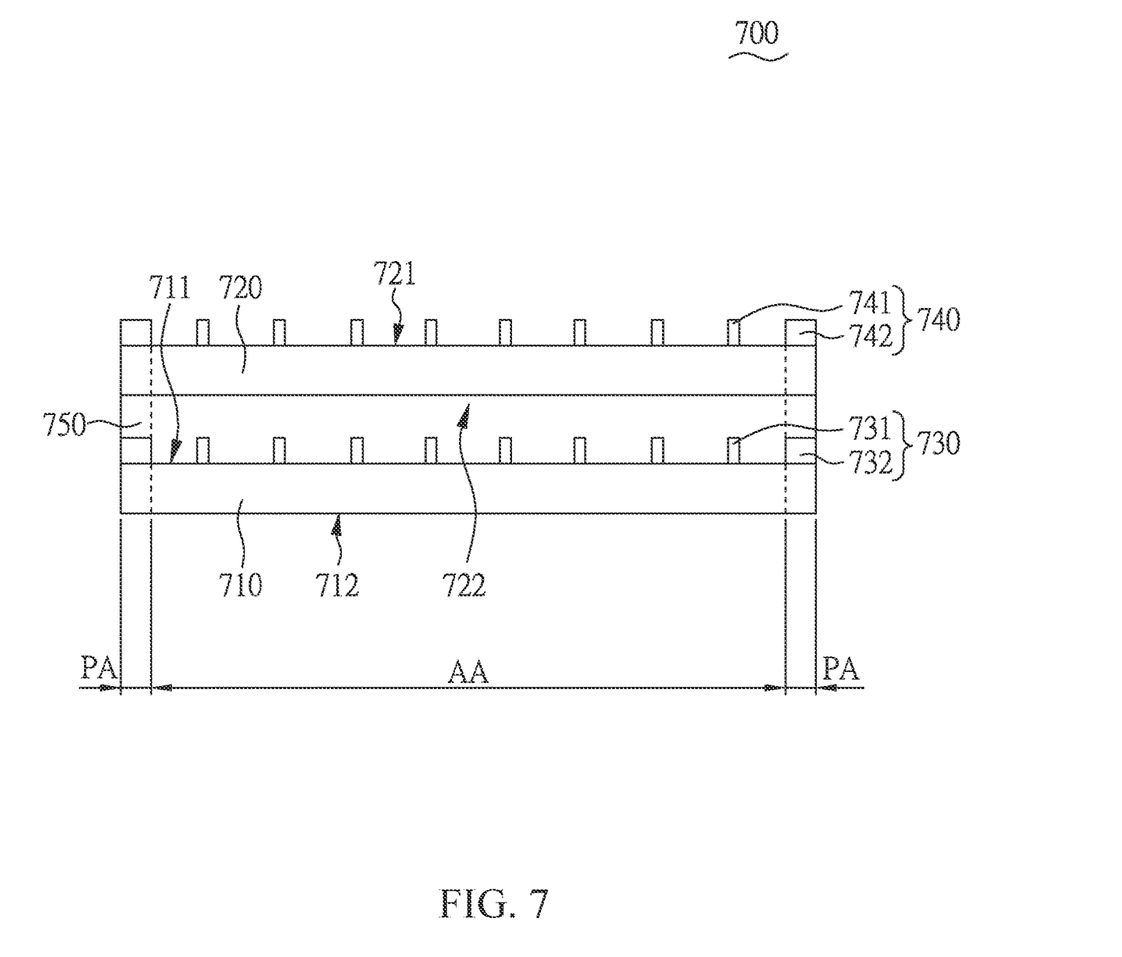
FIG. 7 is a sectional view of the touch panel according to another embodiment of the present disclosure.

In another embodiment, reference is made to FIG. 7, which is a sectional view of the touch panel 700 according to another embodiment of the present disclosure. As shown in FIG. 7, the touch panel 700 includes substrates 710 and 720, conductive mesh films 730 and 740, and an adhesive layer 750. The touch panel 700 has a display area AA and a periphery area PA. The substrate 710 has a surface 711 and a surface 712 opposite to the surface 711. The substrate 720 has a surface 721 and a surface 722 opposite to the surface 721. The conductive mesh film 730 is formed on the surface 711 of the substrate 710. The conductive mesh film 740 is formed on the surface 721 of the substrate 720. The adhesive layer 750 is formed between the conductive mesh film 730 and the surface 722 of the substrate 720, and the substrate 720 is attached to the conductive mesh film 730 by the adhesive layer 750. It is noted that, the traces 731 and 741 are formed on the display area AA, and the conductive wires 732 and 742 are formed on the periphery area PA.

Afterwards, the conductive mesh films 730 and 740 in this embodiment are similar to the embodiment of the conductive mesh film 120. The conductive mesh films 730 and 740 have multiple meshes and multiple conductive wires. For the sake of brevity, those descriptions will not be repeated here.

Figure 8:
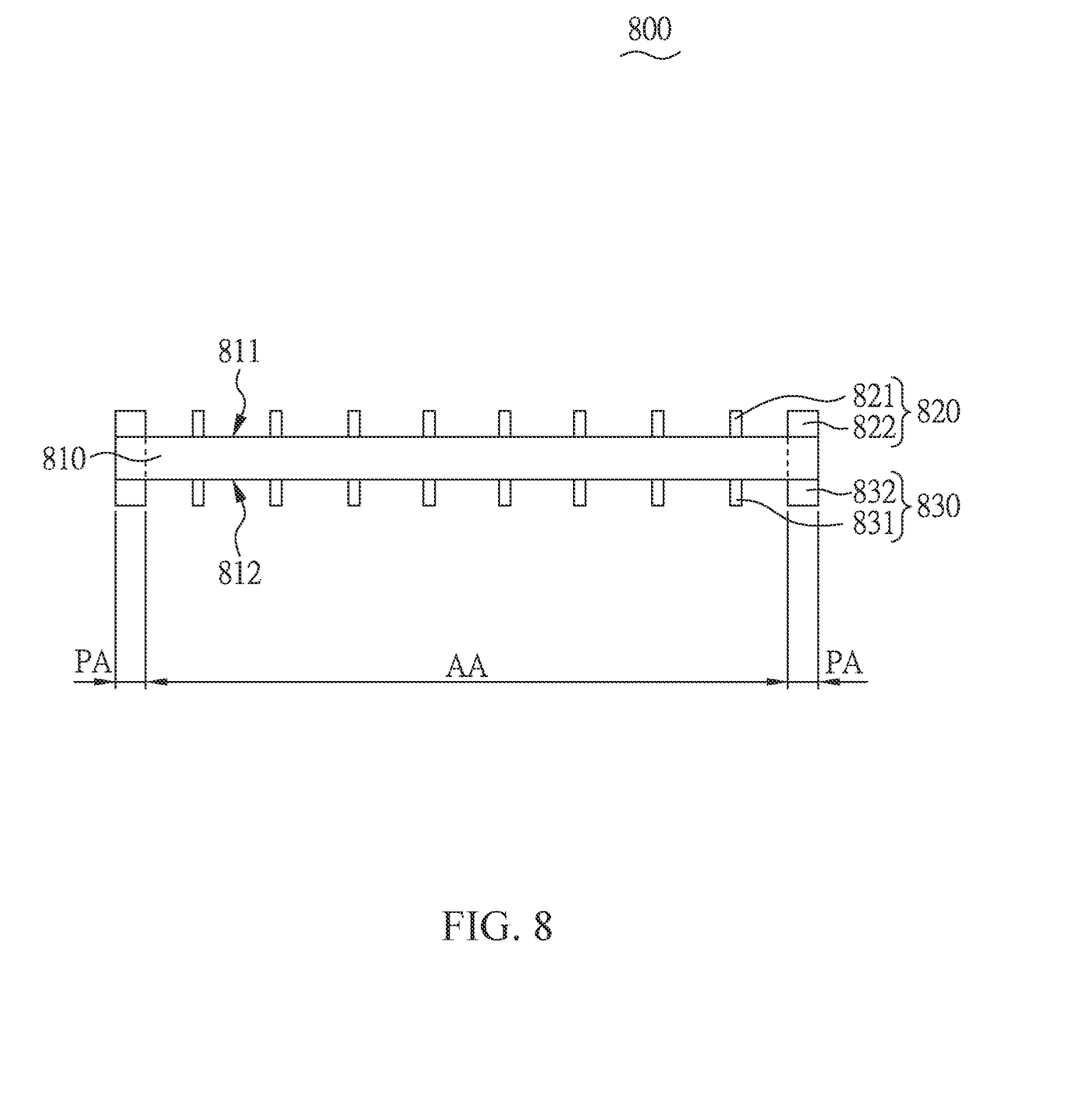
FIG. 8 is a sectional view of the touch panel according to another embodiment of the present disclosure.

In another embodiment, reference is made to FIG. 8, which is a sectional view of the touch panel 800 according to another embodiment of the present disclosure. As shown in FIG. 8, the touch panel 800 includes substrate 810 and conductive mesh films 820 and 830. The touch panel 800 has a display area AA and a periphery area PA. The substrate 810 has a surface 811 and a surface 812 opposite to the surface 811. The conductive mesh film 820 is formed on the surface 811 of the substrate 810. The conductive mesh film 830 is formed on the surface 812 of the substrate 810. The traces 821 and 831 are formed on the display area AA, and the conductive wires 822 and 832 are formed on the periphery area PA. It is noted that, this embodiment can further include an adhesive layer (not shown in FIG. 8), and the adhesive layer is configured to attach the conductive mesh films 820 and 830 to a display panel to form a touch display panel.

Afterwards, the conductive mesh films 820 and 830 in this embodiment are similar to the embodiment of the conductive mesh film 120. The conductive mesh films 820 and 830 have multiple meshes and multiple conductive wires. For the sake of brevity, those descriptions will not be repeated here.

Based on aforesaid embodiments, the transparent conductive film, manufacturing method of a transparent conductive film and touch panel are capable of utilizing the silver nanowires mesh film formed by the silver nanowires. The silver nanowires mesh film has ultra-low sheet resistance and can maintain good transmittance, and the silver nanowires mesh film also has better bending characteristics. Moreover, the silver nanowires mesh can be utilized to replace metal wires in the periphery area to solve the problem of contact impedance generated when connecting metal wires and silver nanowires mesh. Therefore, the silver nanowires mesh film can reduce signal loss and distortion.

The above disclosure is related to the detailed technical contents and inventive features thereof. People skilled in the art may proceed with a variety of modifications and replacements based on the disclosure and suggestions of the disclosure as described without departing from the characteristics thereof. Nevertheless, although such modifications and replacements are not fully disclosed in the above descriptions, they have substantially been covered in the following claims as appended.

What is claimed is:

1. A transparent conductive film, comprising:
    a substrate having a first surface, wherein the substrate comprises a display area and a periphery area; and
    a conductive mesh film disposed on the first surface of the substrate, wherein:
        the conductive mesh film comprises a plurality of silver nanowires,
        the conductive mesh film comprises a plurality of meshes,
        the conductive mesh film disposed in the display area has the meshes,
        the conductive mesh film disposed in the periphery area has a plurality of conductive wires,
        the conductive wires comprise the silver nanowires,
        the meshes comprise a plurality of traces and a plurality of blank areas,
        the conductive wires are respectively electrically connected to the traces of the meshes,
        a sheet resistance of the conductive mesh film is 5 Ω/sq to 30 Ω/sq,
        a sheet resistance of each of the traces and a sheet resistance of each of the conductive wires are 0.1 Ω/sq to 1 Ω/sq,
        a width of each of the traces is 1 μm to 10 μm, and
        a transparency of the conductive mesh film to visible light is greater than 85%.

2. The transparent conductive film as claimed in claim 1, wherein each of the blank areas occupies an area of 100 to 200 μm$^2$ on the first surface.

3. The transparent conductive film as claimed in claim 1, further comprising:
    a coating layer disposed on the conductive mesh film and configured to cover the conductive mesh film, wherein a thickness of the coating layer is 40 nm.

4. The transparent conductive film as claimed in claim 1, wherein a ratio of a total area of the blank areas to an area of the conductive mesh film is 0.9 to 0.999.

5. The transparent conductive film as claimed in claim 1, further comprising:
    a coating layer disposed on the conductive mesh film, wherein a sidewall of the conductive mesh film is coplanar with a sidewall of the coating layer.

6. The transparent conductive film as claimed in claim 5, wherein a thickness of the coating layer is 40 nm.

7. A manufacturing method of a transparent conductive film, comprising:
    coating a silver nanowires layer on a first surface of a substrate, wherein the silver nanowires layer is formed by a plurality of silver nanowires;
    forming a coating layer over the silver nanowires layer;
    patterning the silver nanowires layer to form a conductive mesh film after forming the coating layer, wherein the conductive mesh film comprises a plurality of meshes, and the meshes comprise a plurality of traces and a plurality of blank areas; and
    forming a transparent conductive film, wherein:
        a sheet resistance of the conductive mesh film is 5 Ω/sq to 30 Ω/sq,
        a width of each of the traces is 1 μm to 10 μm, and
        a transparency of the conductive mesh film to visible light is greater than 85%.

8. The manufacturing method of a transparent conductive film as claimed in claim 7, wherein the substrate comprises a display area and a periphery area, the conductive mesh film disposed in the display area has the meshes, the conductive mesh film disposed in the periphery area has a plurality of conductive wires, and the conductive wires are respectively electrically connected to the traces of the meshes.

9. The manufacturing method of a transparent conductive film as claimed in claim 8, wherein the conductive wires comprise the silver nanowires, and a sheet resistance of each of the traces and a sheet resistance of each of the conductive wires are 0.1 Ω/sq to 1 Ω/sq.

10. The manufacturing method of a transparent conductive film as claimed in claim 7, wherein each of the blank areas occupies an area of 100 to 200 μm$^2$ on the first surface.

11. The manufacturing method of a transparent conductive film as claimed in claim 7, wherein a thickness of the coating layer is 40 nm.

12. The manufacturing method of a transparent conductive film as claimed in claim 7, wherein a ratio of a total area of the blank areas to an area of the silver nanowires layer is 0.9 to 0.999.

13. The manufacturing method of a transparent conductive film as claimed in claim 7, comprising:
    patterning the coating layer concurrently with patterning the silver nanowires layer.

14. A touch panel with a display area and a periphery area, the touch panel comprising:
    a first substrate having a first surface and a second surface opposite to the first surface;
    a first conductive mesh film disposed on the first surface of the first substrate;
    a second conductive mesh film disposed on the first conductive mesh film, wherein the first conductive mesh film and the second conductive mesh film comprise a plurality of silver nanowires;
    a second substrate; and
    an adhesive layer, wherein:
        the first conductive mesh film and the second conductive mesh film comprise a plurality of meshes,
        the meshes comprise a plurality of traces and a plurality of blank areas,
        a sheet resistance of the first conductive mesh film and a sheet resistance of the second conductive mesh film are 5 Ω/sq to 30 Ω/sq,
        a width of each of the traces is 1 μm to 10 μm,
        a transparency of the first conductive mesh film and a transparency of the second conductive mesh film to visible light are greater than 85%,
        the second substrate has a third surface and a fourth surface opposite to the third surface,
        the second conductive mesh film is disposed on the third surface of the second substrate, and
        the adhesive layer is disposed between the first conductive mesh film and the fourth surface such that the second substrate is between the second conductive mesh film and the adhesive layer.

15. A touch panel with a display area and a periphery area, the touch panel comprising:
a first substrate having a first surface and a second surface opposite to the first surface;
a first conductive mesh film disposed on the first surface of the first substrate; and
a second conductive mesh film disposed on the second surface of the first substrate, wherein:
the first conductive mesh film and the second conductive mesh film comprise a plurality of silver nanowires,
the first conductive mesh film and the second conductive mesh film comprise a plurality of meshes,
the first conductive mesh film and the second conductive mesh film disposed in the display area have the meshes,
the first conductive mesh film and the second conductive mesh film disposed in the periphery area have a plurality of conductive wires,
the conductive wires comprise the silver nanowires,
the meshes comprise a plurality of traces and a plurality of blank areas,
the conductive wires are respectively electrically connected to the traces of the meshes,
a sheet resistance of the first conductive mesh film and a sheet resistance of the second conductive mesh film are 5 Ω/sq to 30 Ω/sq,
a sheet resistance of each of the traces and a sheet resistance of each of the conductive wires are 0.1 Ω/sq to 1 Ω/sq,
a width of each of the traces is 1 μm to 10 μm, and
a transparency of the first conductive mesh film and a transparency of the second conductive mesh film to visible light are greater than 85%.

* * * * *